United States Patent [19]
Nori et al.

[11] Patent Number: 6,108,664
[45] Date of Patent: Aug. 22, 2000

[54] OBJECT VIEWS FOR RELATIONAL DATA

[75] Inventors: Anil Nori, San Jose; Chin Hong, Hillsborough; Joyo Wijaya, Menlo Park; Tze-Pin Cheng, Milpitas; Robert P. Kooi, deceased, late of Lafayette, all of Calif., by Vicki L. Kooi, legal representative

[73] Assignee: Oracle Corporation, Redwood Shores, Calif.

[21] Appl. No.: 08/962,415

[22] Filed: Oct. 31, 1997

(Under 37 CFR 1.47)

[51] Int. Cl.$^7$ .................................................. G06F 17/30
[52] U.S. Cl. ........................ 707/103; 707/102; 707/104
[58] Field of Search ................. 707/103, 2, 10, 707/101, 102, 104; 711/203; 345/348

[56] References Cited

U.S. PATENT DOCUMENTS

| | | | |
|---|---|---|---|
| 5,335,346 | 8/1994 | Fabbio | 395/600 |
| 5,426,747 | 6/1995 | Weinreb et al. | 711/203 |
| 5,448,727 | 9/1995 | Annevelink | 707/101 |
| 5,560,005 | 9/1996 | Hoover et al. | 707/10 |
| 5,615,367 | 3/1997 | Bennett et al. | 707/102 |
| 5,680,563 | 10/1997 | Edelman | 345/348 |
| 5,724,575 | 3/1998 | Hoover et al. | 707/10 |
| 5,752,018 | 5/1998 | Sheffield | 707/2 |
| 5,765,159 | 7/1998 | Srinivasan | 707/102 |
| 5,809,297 | 9/1998 | Kroenke et al. | 707/102 |
| 5,815,710 | 9/1998 | Martin et al. | 709/303 |
| 5,832,498 | 11/1998 | Exertier | 707/103 |
| 5,907,846 | 5/1999 | Brener et al. | 707/103 |
| 5,926,819 | 7/1999 | Doo et al. | 707/104 |
| 5,937,409 | 8/1999 | Wetherbee | 707/103 |
| 5,995,973 | 11/1999 | Daudenarde | 707/103 |

*Primary Examiner*—Hosain T. Alam
*Assistant Examiner*—Ella Colbert
*Attorney, Agent, or Firm*—Hickman Palermo Truong & Becker, LLP; Brian D. Hickman; Marcel K. Bingham

[57] ABSTRACT

A method and apparatus for presenting and modifying data from a set of tables in a database is provided. A view that is defined is based on a set of one or more tables that may include relational tables or object tables. The view defines a presentation of data from the one or more tables as a set of objects that reside in the database. Data is read from the one or more rows of the tables based on the view, and is presented as a set of objects that reside in the database. An object id that is based on data from the one or more rows is generated and associated with each object presented. The view may specify which columns from the one or more tables contain values used to generate the object ids. A trigger may associated with the view. The set of objects presented may be presented as objects having an attribute that is a column object. Column objects include user specified object types, collection objects (e.g. nested tables and variable arrays), or references to objects.

39 Claims, 12 Drawing Sheets

FORMER- EMPLOYEE Table Definition

Create Table FORMER EMPLOYEE (

NAME    VARCHAR (30),
        SSN     VARCHAR (11),
        STATE   VARCHAR (2));

*Fig. 3A*

Table FORMER_EMPLOYEE

| Name | SSN | State |
|---|---|---|
| Frank Doe | 999-99-997 | CA |
| Jane Doe | 999-99-998 | CA |
|  |  |  |
|  |  |  |

*Fig. 3B*

OT_EMPLOYEE
Create Type OT_EMPLOYEE As Object (

NAME    VARCHAR2 (20),
        SSN     VARCHAR2 (11),
        STATE   REF STATE));

Table CURRENT_EMPLOYEES

| OID | Name | SSN | State |
|---|---|---|---|
| 000000 | John Doe | 999-99-9999 | CA |
| 000001 | Jane Doe | 999-99-9998 | AL |
|  |  |  |  |
|  |  |  |  |

308

Create View OV_FEMPLOYEE of OT_EMPLOYEE
With Object OID (SSN)
As Select NAME, SSN, STATE
    From FORMER_EMPLOYEES

| OID | NAME | STATE |
|---|---|---|
| 999-99-9999 | Frank Doe | CA |
| 999-99-9998 | Jane Doe | CA |
|  |  |  |
|  |  |  |

*Fig. 3F*

Create View OV_STATE_FEMPLOYEE of OT_SEMPLOYEE

AS Select FORMER_EMPLOYEE. NAME,
        FORMER_EMPLOYEE. SSN,
        STATE. NAME From FORMER_EMPLOYEE,

STATE

Where FORMER_EMPLOYEE. STATE=STATE. ABBR;

*Fig. 3G*

TABLE STATE

| NAME | ABBR |
|---|---|
| California | CA |
| Alabama | AL |
|  |  |

*Fig. 3H*

```
Create OV_PERSON of OT_FAMILY As
    Select
        OT_PERSON_ID(p.NAME, p.SSN), CAST (Multiset ( Select * From PERSON p1 Where
            p.FATHER_SSN = p1.SSN Or
            p.MOTHER.SSN = p1.SSN)
        As PARENTS), CAST (Multiset( Select * From PERSON p2 Where
            p.SSN  =  p2.FATHER_SSN Or
            p.SSN  =  p2.MOTHER_SSN)
        AS CHILDREN)

From PERSON p;
```

*Fig. 6A*

```
Create Type OT_FAMILY as Object (
    PERSON_ID    OT_PERSON_ID,
    PARENTS      LIST_OF_PARENTS,
    CHILDREN     LIST_OF_CHILDREN,
);
```

*Fig. 6B*

```
Create Table PERSON (
      NAME    VARCHAR(30),
      SSN     VARCHAR(9),
      FATHER_SNN VARCHAR(9),
      MOTHER_SNN  VARCHAR(9),
);
```

*Fig. 6C*

```
Create Type OT_PERSON_ID as Object (
      NAME    VARCHAR(30),
      SSN     VARCHAR(11)
);
```

*Fig. 6D*

Create LIST_OF_CHILDREN as Table of OT_PERSON_ID;

*Fig. 6E*

Create LIST_OF_PARENTS as VARRAY(2) of OT_PERSON_ID;

*Fig. 6F*

OBJECT VIEWS FOR RELATIONAL DATA

RELATED APPLICATION

The present application is related to U.S. patent application Ser. No. 08/961,740, entitled "REFERENCES TO GLOBAL DATABASE OBJECTS", pending filed by Chin-Heng Hong, Sudheer Thakur, Anil Nori, Joyo Wijaya, on the equal day herewith, the contents of which are incorporated herein by reference.

U.S. patent application Ser. No. 08/961,794, entitled "APPARATUS AND METHOD FOR PICKLING DATA", pending filed by John Wiesz, on the equal day herewith, the contents of which are incorporated herein by reference.

U.S. patent application Ser. No. 08/962,409, entitled "APPARATUS AND METHOD FOR OBJECT REPRESENTATION AND STORAGE IN A RELATIONAL DATABASE SYSTEM", pending filed by Anil Nori, John Weisz, Vikas Arora, Subramanian Muralidhar, on the equal day herewith, herein referred to as, the contents of which are incorporated herein by reference.

U.S. patent application Ser. No. 08/962,535, entitled "APPARATUS AND METHOD FOR STORAGE OF OBJECT COLLECTIONS IN A DATABASE SYSTEM", pending filed by Anil Nori, Vishu Krishnamurthy, Vikas Arora, Srinath Krishnaswamy, on the equal day herewith, the contents of which are incorporated herein by reference.

U.S. patent application Ser. No. 08/962,416, entitled "APPARATUS AND METHOD FOR NULL REPRESENTATION IN DATABASE OBJECT STORAGE", pending filed by Anil Nori, John Weisz, Subramanian Muralidhar, on the equal day herewith, the contents of which are incorporated herein by reference.

FIELD OF THE INVENTION

The present invention relates to database systems, and in particular, to generating views of data from tables contained in object-relational databases and relational databases.

BACKGROUND OF THE INVENTION

A substantial number of databases in use are relational databases. A relational database models the world in terms of relational tables. For example, a relational table FRIENDS may be used to model persons who are friends. Each row in the relational table FRIENDS represents one friend.

Each column of a relational table can represent a characteristic of a friend. Assume one column of the relational table FRIENDS is NAME, and another is SOCIAL SECURITY NUMBER. One row in FRIENDS contains the value of "John Doe" for the NAME column and the value of "999-99-9999" for the SOCIAL SECURITY NUMBER column.

In an object-relational database, the world can be modeled using a type system fundamentally based on object types. An object type is associated with one or more attributes and zero or more methods. Instances of object types are known as "objects". Each object contains values for its attributes. The values of the attributes are collectively referred to as the object's state. Each object that is an instance of a particular object type has the same attributes. The methods associated with an object (i.e. methods associated with the object type of the object) operate upon the state of an object.

Object-relational databases contain object tables, which are tables that contain objects. Each object in an object table belongs to the same object type. More than one table may contain objects of a particular object type. For example, the tables FRIENDS and EMPLOYEES may both contain objects of the object type PERSON. Each row of data in a table stores the state of an object. Each column of an object table corresponds to an attribute of the objects contained in the object table.

For example, PERSON may define several attributes for objects which represent persons. Assume one attribute is NAME and another is SOCIAL SECURITY NUMBER. Further assume that object table EMPLOYEE contains objects belonging to PERSON. One column in EMPLOYEE corresponds to the NAME attribute, another column corresponds to the SOCIAL SECURITY NUMBER attribute.

Each row in EMPLOYEE contains data about one object. One row, for example, contains data for the object representing one employee with a NAME value of John Doe and having a SOCIAL SECURITY NUMBER value of "999-99-9999". One column for the row contains the value for the NAME attribute, and another column contains the value for the SOCIAL SECURITY NUMBER attribute.

Object-relational databases offer many advantageous features not offered by relational data tables. One such feature is the ability to create multiple tables with identical columns without having to create, for each table, a separate set of identical definitions for the columns. For example, it may be desirable to create two tables with identical columns, each having a NAME column and a SOCIAL SECURITY NUMBER column. In an object-relational database, the creation of these tables can be achieved by defining one object type, such as the PERSON, having the two attributes NAME and SOCIAL SECURITY NUMBER. Then two object tables, FRIENDS and EMPLOYEE, can be defined as tables having objects belonging to PERSON. It is only necessary to define the columns (i.e. attributes) of FRIENDS and EMPLOYEE once.

One the other hand, creating two tables analogous to the above two tables using a relational database requires two separately stored table definitions, each having their own set of column definitions. For example, to create the FRIENDS table requires one table definition, and to create the EMPLOYEE table requires another. The FRIENDS table definition contains a column definition for NAME and for SOCIAL SECURITY. The table EMPLOYEES requires another table definition identical to the table definition for FRIENDS. It is thus necessary to define each column twice.

Another feature is that attributes of an object may be collection data types such as nested tables or varrays (variable length arrays). These data types enable the modeling of one to many relationships within one object table. For example, an object type can represent a person, a children attribute (of the object type) can be a collection data type which may represent the one or more children of the person.

On the other hand, to model the parent-child relationship in a relational database requires at least two relational tables. One to model persons, another to model the parent-child relationships. The relational table that models the parent-child relationships would have one column identifying the person who is the parent and another column identify a person who is a child of the parent. A row would exist for each child, each row having a value in the parent column identifying the parent and a value in the child column identifying the child.

Another advantage offered by an object-relational database is that data may be modeled in the same manner as data is modeled in client-side applications written in object oriented languages. For example, C++, an object oriented language, models data using a type system based on object types (i.e. classes). Such applications can receive data from a object-relational database in form of objects having the same data structure as object types used by the application software. On the other hand, when receiving data from a relational database, the data received is mapped and translated into the attributes of objects used by the application. This mapping and translation not only requires more work by the computer system at run-time, but also requires more work by developers of application software to develop code for mapping and translating.

Another advantage offered by object-relational databases is that an object id is associated with each object in the database. The object id uniquely identifies an object relative to all the objects in the database system, including objects belonging to a different object type and contained in different object tables. For example, assume that in addition to the FRIENDS and EMPLOYEE object tables, which contain objects belonging to PERSON, a database contains object tables DEPARTMENTS and EMPLOYEE POSITIONS. Objects in DEPARTMENTS belong to the ORGANIZATION object type, and objects in EMPLOYEE POSITIONS belong to the JOBS object type.

The object id associated with the object in EMPLOYEE representing John Doe is unique among object ids of objects of the same object type in other object tables, such as FRIENDS. Furthermore, the object id is unique among all the object ids associated with any object belonging to any object type, such as the objects in object tables DEPARTMENTS and EMPLOYEE POSITIONS.

Most conventional databases systems in use are relational databases. For many users of these databases who seek the advantages of object-relational databases, it is desirable to operate upon the existing data in the relational database as if the data where objects from a database.

Conventional database systems do not provide a mechanism for operating upon relational data as if the data where objects from a database because conventional systems model data using a different manner of abstraction than object-relational systems. More specifically, conventional database systems (i.e. relational databases) are adapted to model entities in terms of rows and columns in a table that relate to each other, not as objects that belong to an object type, or are collections of or references to other objects.

A conventional approach for working around the lack of a mechanism for operating upon relational data as if it where objects is the conversion approach. In the conversion approach the data existing in relational databases is converted and transferred to object tables in an object-relational database.

Because of the problems inherent in the conversion approach, many users of relational databases are either postponing the conversion of their relational databases to object-relational databases, or are gradually migrating to object-relational databases. Users that are gradually migrating incrementally convert only portions of their relational database. The reasons users are converting to object-relational databases in this manner is that completely converting one entire database to another database is usually a very expensive and risky undertaking. For many users, such as organizations that have been using a relational database for many years, completely converting an entire database often exceeds available monetary and personnel resources. The attendant risk of losing data in a database during a complete conversion, even temporarily, are often too high to undertake.

Based on the foregoing, it desirable to provide a mechanism which permits users to treat data stored in relational databases as data from an object-relational database. It is further desirable to provide a method that allows the users of relational databases to enjoy the advantages of object-relational databases without having to convert their existing relational database to an object-relational database.

SUMMARY OF THE INVENTION

A method and apparatus for presenting and modifying data from a set of tables in a database is described. According to one aspect of an invention, a view that is defined is based on a set of one or more tables that may include relational tables or object tables. The view defines a presentation of data from the one or more tables as a set of objects that reside in the database. Data is read from the one or more rows of the tables based on the view, and is presented as a set of objects that reside in the database.

According to another aspect of the invention, an object id that is based on data from the one or more columns is generated and associated with each object presented. The view may specify which columns from the one or more tables contain values used to generate the object ids. References to the objects presented may be based on the object ids of the underlying object tables or object view rows.

According to another aspect of the invention, a trigger is associated with the view. The trigger is invoked in response to a request to modify content of one or more tables through the view. The trigger may be invoked to modify the contents of the one or more tables.

According to another aspect of the invention, the set of objects presented may be presented as objects having an attribute that is a column object. Column objects include user specified object types, collection objects (e.g. nested tables and variable arrays), or references to objects. The column objects may be constructed based on data from one or more relational tables.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A through 3H show various exemplary tables, table definitions, object types, and object views used to illustrate various embodiments of the invention;

FIG. 6 shows various exemplary tables, table definitions, object types, and object views used to illustrate object views with column objects.

DETAILED DESCRIPTION OF THE PREFERRED EMBODIMENT

A method and apparatus for providing object views is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
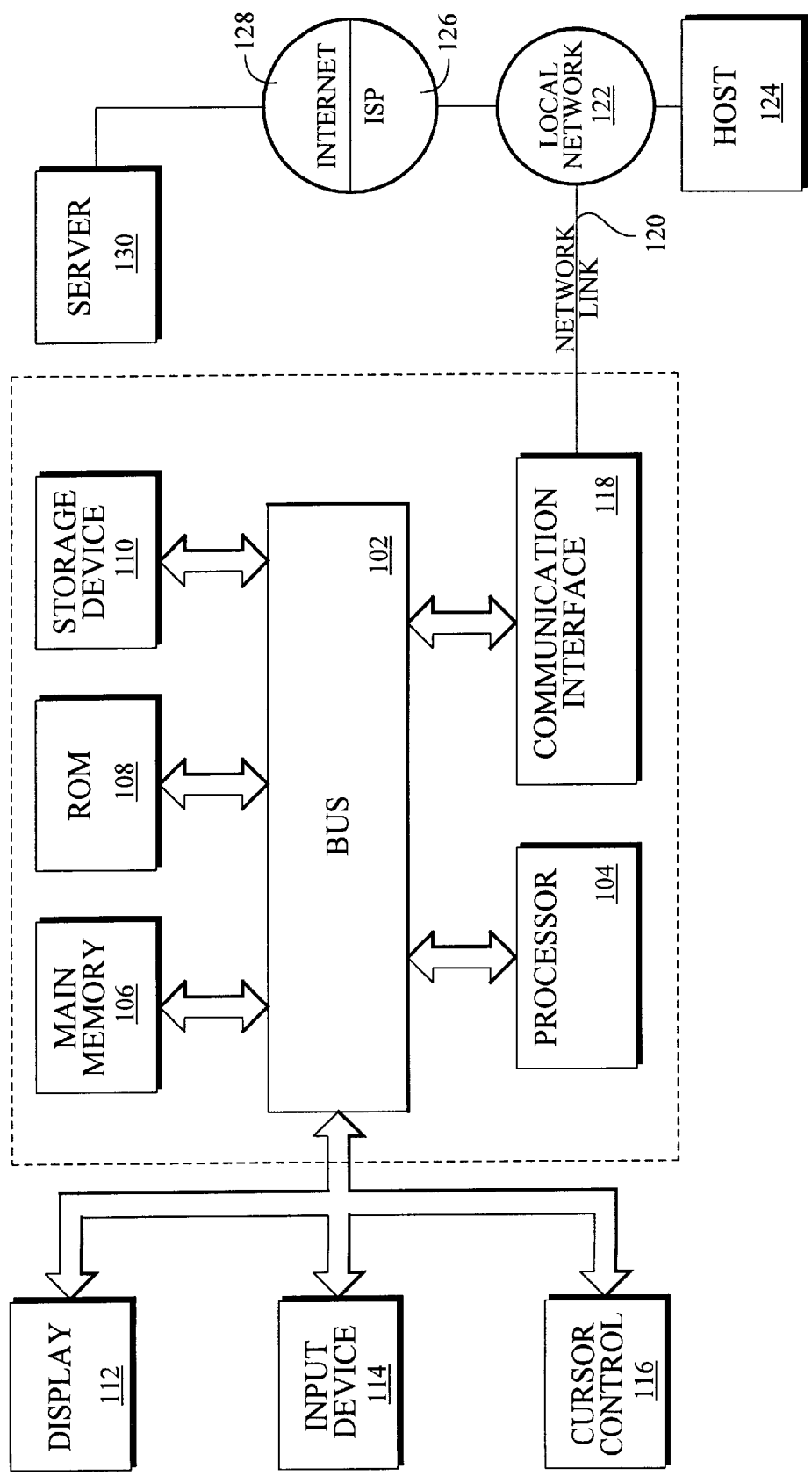
FIG. 1 is a block diagram of a computer system on which the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for providing object views. According to one embodiment of the invention, object views are provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for object views as described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

According to embodiments of the invention, data from relational tables is presented to users as if it were from objects from an object-relational database. The vehicle through which data is presented in this manner is referred to herein as an "object view". To model data in relational tables as objects in a database, object IDs are generated for the objects presented by an object view.

Figure 2:
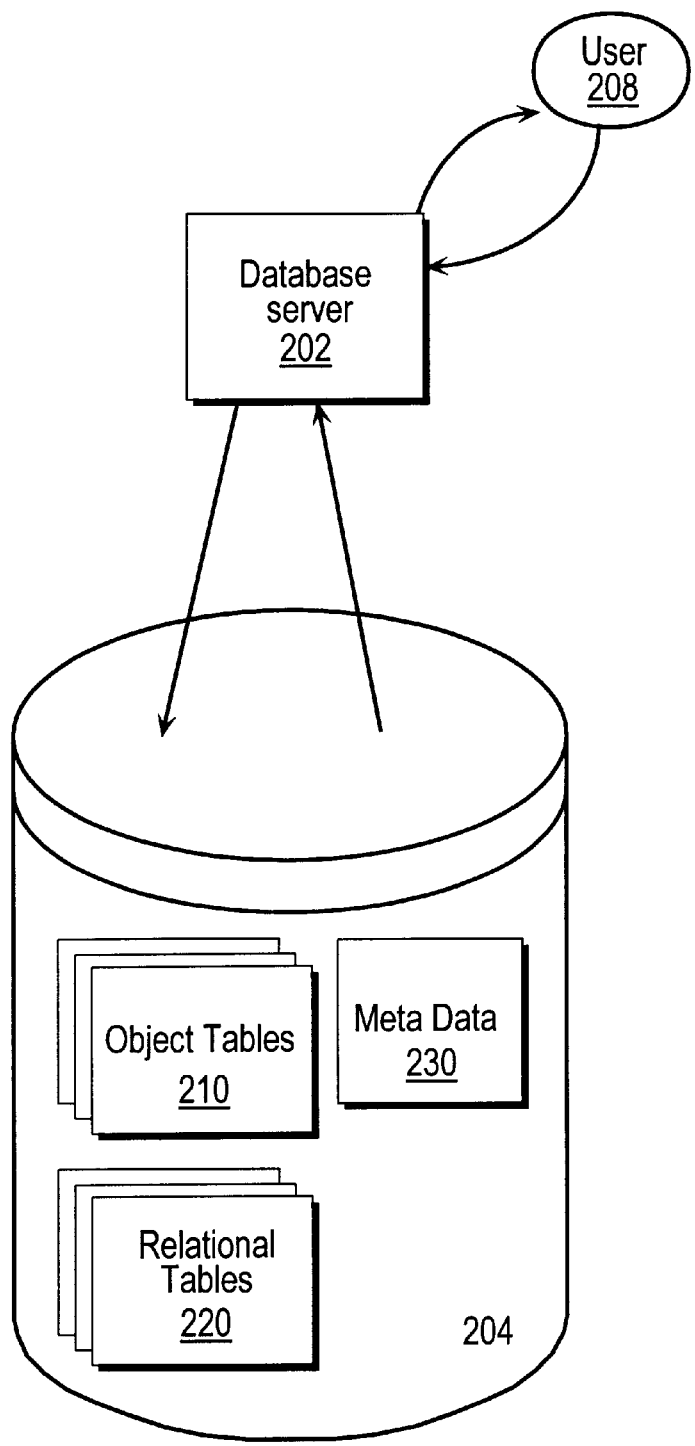
FIG. 2 is a block diagram of a database system on which the present invention may be implemented.

Referring to FIG. 2, the object ids generated, for example, by database server 202 uniquely identify an object relative to the object ids associated with the other objects accessible by database server 202, including objects from databases other than database 204. In addition, object views may present data from relational tables and object tables as objects with attributes that are objects.

Like conventional views, the data presented by an object view may not be modifiable through the object view. However, according to one embodiment of the invention, "instead-of triggers" enable data from relational tables that may not be otherwise modified through the object view to be modified through the object view.

DATABASE MANAGEMENT SYSTEMS

A database management system (DBMS) typically includes one or more database servers and one or more databases. A database server is a computer program or group of computer programs used to manage data in a database for the benefit of one or more database users. A user may be an individual or a computer system, including the computer system executing the database server.

In the computer system 100 of FIG. 1, sequences of instructions that belong to the database server are executed by the processor 104 to carry out requests of a database user. These include requests to create storage organizations, requests to store data in storage organizations previously created, requests to present views of data held in storage organizations, and requests to operate on data held in storage organizations either directly or through a view.

FIG. 2 depicts database server 202, which manages database 204. Database 204 contains the storage organizations managed by the database server 202. Database server 202 manages object tables 210, relational tables 220, and metadata 230. Metadata contains data which defines data structures or data types used by a database server, including storage organizations such as object tables 210 and relational tables 220.

In FIG. 2, a database user 208 is connected to database server 202. The requests issued by user 208 include requests in the form supported by the database server 202. Such requests may take the form, for example, of structured query language (SQL) statements, or in the form PL/SQL™ code. The requests may also arrive in the form of functions invoked by software, such as software written in PL/SQL™, running on user 208. The functions invoked are part of a set of functions comprising an application interface (API) supported by database server 202, such as OCI™. PL/SQL™ and OCI™ are trademarks of Oracle corporation.

Tables are storage organizations used to hold data in a database. Herein, the term "table" generally refers to data structure containing one or more categories of data and includes, but is not limited to, object tables and relational tables. Database server 202 is an object-relational database server that supports object oriented methodologies and relational methodologies.

DATA DEFINITIONS

The data in metadata that defines a particular data structure or data type is referred to as the data definition of the data structure or data type. Data definitions are used, for example, to define object types, object tables, or relational tables. A data definition may be created in response to receiving an SQL statement to create a table. For example, FIG. 3A represents the exemplary table definition for a table named FORMER_EMPLOYEE (FIG. 3A). The table definition in FIG. 3A defines a column called NAME and specifies the column's data type as a VARCHAR having a maximum length of 30. VARCHAR is a primitive data type recognized by a database server, such as Oracle8™. A VARCHAR is a string for which a maximum length can be specified. Other examples of primitive data types include INTEGER and FLOAT. In addition to NAME, the relational table FORMER_EMPLOYEE is defined as having columns SSN and STATE . FIG. 3B shows the relational table FORMER_EMPLOYEE populated with sample data.

Figures 3C, 3D:

Object types are composed of one or more attributes that belong to data types specified by a user, and may include primitive data types, other object types, or collections. A database server typically defines an object type in response to receiving a request to create an object type. When the database server defines an object type, a data definition for the object type is created by the database server and stored as metadata in the database. For example, FIG. 3C depicts the object type OT_EMPLOYEE. The object type OT_EMPLOYEE defines an attribute called NAME and specifies the attribute's data type as a VARCHAR having a maximum length of 30. In addition to the NAME attribute, the object type OT_EMPLOYEE is defined as having attributes SSN and STATE.

OBJECT TABLES AND OBJECT IDENTIFIERS

As mentioned previously, an object table contains objects belonging to the same object type. An object table is created by specifying, in the request to create an object table, the object type to which the table's objects belong. For example, the object table CURRENT_EMPLOYEES, shown in FIG. 3D, is created by database server 202 in response to receiving the following SQL statement:

Create Table CURRENT_EMPLOYEES of OT_EMPLOYEE;

Each row in the object table CURRENT_EMPLOYEES contains the attributes of an object belonging to the object type OT_EMPLOYEE. Each column of the object table CURRENT_EMPLOYEES represents an attribute of the objects belonging to the object type OT_EMPLOYEE. For example, referring to FIG. 3D, the row 308, represents an object belonging to the object type OT_EMPLOYEE and having a NAME attribute value of "John Doe", an SSN attribute value of "999-99-9999", and a STATE attribute value of "CA".

Each object in object table 3D is associated with an object id. An object ID is assigned by the database server when an object in an object table is created. An object may be created, for example, when an SQL insert command is received. The object id is unique among any object created by any application that uses the same id assignment mechanism in generating object ids for objects, including other database servers that use the same id assignment mechanism.

OBJECT VIEWS

A view is a presentation of data to a database user. An object view is a presentation of data to a database user as objects of an object type residing in a database. The data that is presented may include data from an object-relational database or from a relational database. An object view typically does not contain the data presented, but rather contains mappings to the one or more tables containing the data. In generating an object view, the database server translates the mappings of a datum to be presented into an address of a data value held in or pointed to by a table.

For convenience, the data presented in an object view is occasionally referred to herein as "view data", but is typically not stored in the view.

The tables that are mapped to present data in the view are referred to herein as base tables. The base tables may comprise object tables or relational tables. Base tables are occasionally described herein as "providing data" to the view, but this is merely a convenient expression to denote the act of translating a datum referenced in the view into a memory location in or pointed to by the base table and accessing the contents therein. Any number of well known techniques may be employed to translate mappings in the view to table data and such techniques will not be described in detail herein.

Like tables, object views are created by definitions, referred to herein as object view definitions. Object view definitions are specified by a database server user. FIG. 3E depicts the object view definition used to present object view OV_FEMPLOYEE of FIG. 3E. The object view definition specifies the base table for the object view to be FORMER_EMPLOYEES, from which data presented in OV_FEMPLOYEE is drawn.

The object view definition also specifies the object type to which the objects presented by the object view belong, and columns of base tables that correspond to the attributes of the objects. The value of an attribute of a presented objects is generated from the value stored in the column (of row in a base table) that corresponds to the attribute. For example, view definition OV_FEMLOYEE, shown in FIG. 3E, specifies that objects presented in the view definition have a NAME, SSN, and STATE attribute as defined by the object type OT_EMPLOYEE (FIG. 3C), and that the NAME, SSN, and STATE columns of FORMER_EMPLOYEES correspond to the NAME, SSN, and STATE attributes. Attributes of objects presented by an object view are referred to as attributes of the object view.

FIG. 3F shows object view 360, which is an object view of data based on the object view definition OV_FEMPLOYEE (FIG. 3E) and the data in relational table FORMER_EMPLOYEE (FIG. 3B). Each row in the object view 360 represents an object presented by OV_FEMPLOYEE. The NAME and STATE columns correspond to the NAME and STATE attributes of each object. The values of the attributes NAME and STATE correspond to the values of the columns NAME and STATE from the relational table FORMER_EMPLOYEES.

Finally, each object presented by an object view may be associated with a object id. Any operations which may be performed on an object in an object table can be performed on objects presented by an object view.

DEFINING KEY-BASED OIDS

An object view definition may specify one or more attributes whose values are to be used to form OIDs for the objects presented by an object view. The attributes that are specified in this manner are referred to as the OID columns. An OID comprised of OID columns is referred to as a key-based OID. For example, the clause WITH OBJECT OID(SSN) in the object view definition for OV_FEMPLOYEE (FIG. 3E) specifies the SSN attribute of OV_FEMPLOYEE as the OID column for the object view.

When an object view does not specify OID columns, and one base table of the object view is an object table, by default the object ids of the objects in the object table are used as the object ids of the objects presented by the object view.

Figure 4A:
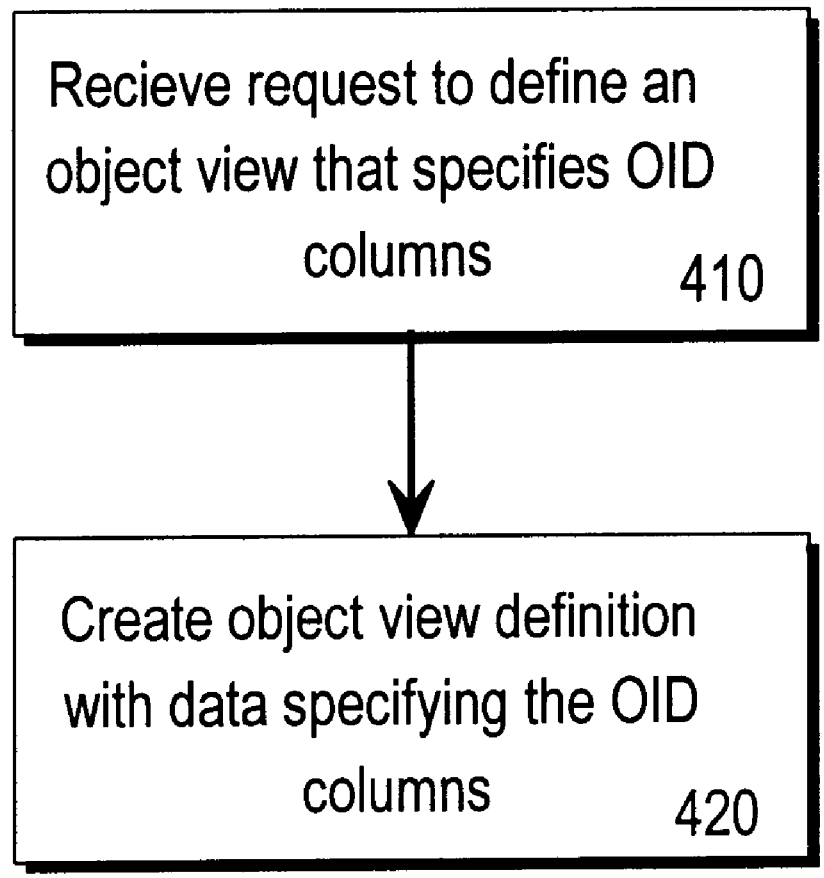
FIG. 4A is a flow chart showing steps for creating an object view that includes column OIDs.

FIG. 4A shows the steps of a method for defining a view with key-based OIDs. The steps of FIG. 4A are illustrated with reference to an example based on object view OV_FEMPLOYEE (FIG. 3F) and table FORMER_EMPLOYEE (FIG. 3B).

At step 410, database server 202 receives a request to define an object view that specifies a key-based OID. For example, database server 202 an SQL statement similar in form to the OV_EMPLOYEE definition represented by FIG. 3E.

At step 420, database server 202 defines the object view by creating an view definition. When creating the view definition, database server 202 stores in the object view definition metadata specifying the object type of the objects presented by the object view. Database server also stores metadata specifying the OID columns.

GENERATING KEY-BASED REFERENCES TO OBJECTS

Because an OID uniquely identifies the object with which the OID is associated, OIDs are useful for generating references to objects. A reference to an object contains data that is used to locate the object. References based on key-based OIDs are referred to as key-based references. Methods for storing key-based OIDs in key-based references are described in U.S. patent application Ser. No. 08/961,740 (attorney docket no. 3018-094), the contents of which are incorporated herein by reference. Key-based references to objects are generated by database server 202 in response to receiving requests that require the generation of key-based OIDs.

Figure 4B:
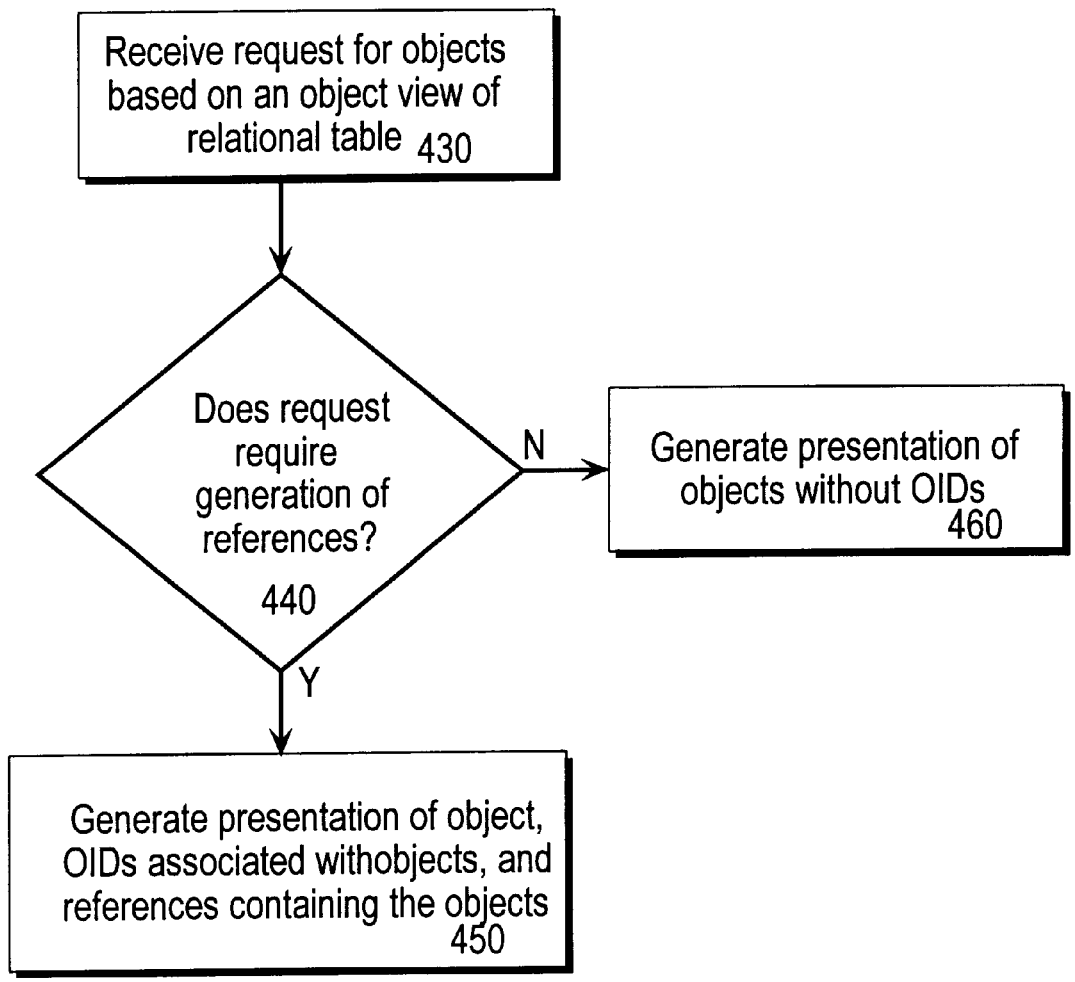
FIG. 4B is a flow chart showing steps for generating OIDs and key-based references.

FIG. 4B shows the steps for generating OIDs and key-based references. The steps of FIG. 4B are illustrated with reference to an example based on object view OV_FEMPLOYEE (FIG. 3F) and table FORMER_EMPLOYEE (FIG. 3B).

At step 430, database server 210 receives a request for objects based on an object view on a relational table. The object view specified by the request is referred to as the requested object view. Assume, for example, that user 208 transmits the following SQL statement to database server 202.

Select    REF(OV_FEMPLOYEE)    From
    OV_FEMPLOYEE;

The preceding SQL statement represents a query specifying the return of references to the objects presented by object view OV_FEMPLOYEE. The query represented by the preceding SQL statement is referred to as the requested query. The data returned in response to a query is herein referred to as the query results. The objects contained in the query results are referred to as the returned objects.

At step 440, it is determined whether the request received at step 430 requires the generation of references. In this example, because the SQL statement received in step 430 specifies the return of references, the determination is that the request received in 430 requires the generation of references. If references do not have to be generated, control passes to step 460, where the presentation of objects is generated without OIDs and references to the objects. Otherwise, control passes to step 450.

At step 450, database server 202 reads data from the rows of base tables to generate the requested object view, the key based OIDS associated with objects to be presented, and references containing the key-based OIDs. First, the database server executes the query specified by the view (e.g. executes the select statement specified in a view definition). The database server scans the rows of the base tables specified by query to produces result rows having the columns specified by the query, including the OID columns.

Next, for each result row, values in the one or more columns that correspond to the attributes of the object type associated with the object view are used to construct an object having the attributes specified by the object type. Finally, one or more columns in the result row corresponding to the OID column(s) are used to generate an object id that is associated with object.

In this example, database server 202 scans all the rows of FORMER_EMPLOYEE, the base table underlying OV_FEMPLOYEE, and produces result rows having columns corresponding to the NAME, SSN, and STATE columns of FORMER_EMPLOYEE.

For each result row, data from the column corresponding to the SSN column of FORMER_EMPLOYEE is read because this column in the result row corresponds to the OID column. The data read from the SSN column is used to generate the key-based OID associated with each object presented by the view. For each object presented by the view, a reference containing the key-based OID is generated.

LOCATING OBJECTS BASED on KEY-BASED REFERENCES

When the key-based references are returned to user 208, user 208 may store them so that the references may be later used to identify the objects in subsequent requests.

A request for an object that uses a reference to specify the sought object can come in various forms. For example, the request may be in the form of a pin. A pin is a request that specifies an object to load into memory so that it may be accessed and manipulated. An API, such OCI™, provides functions for pinning objects, including pinning objects presented by object views. One parameter of such a function is a key-based reference specifying the object to be pinned.

An SQL statement, issued by a database user, may specify the reference of the object sought. Consider a query of the object view OV_FEMPLOYEE (FIG. 3F), represented by the following PL/SQL™ code:

Declare empref Ref OT_EMPLOYEE;

Select NAME From OV_FEMPLOYEE e Where REF (e)=empref1;

The first line represents a declaration of a reference variable name "empref". Assume that when computer instructions represented by the second line of code are being executed by data server 202, empref represents a key-based reference containing an OID having a value of '999-99-9999'. When user 208 executes the computer instructions represented by the above PL/SQL™ statement, user 208 transmits a request to database server 202 for a query of the object specified by the reference represented by empref. In response, database server 202 locates the object. A method for locating an object in response to a request based on a key-based reference is described in patent application Ser. No. 08/961,740 (attorney docket no. 3018-094).

COLUMN OBJECTS

Object views may present data from tables as objects having attributes that are objects. Object that are attributes of other objects are referred to as column objects. Column objects include objects belonging to an object type, collection objects, such as a VARRAY (variable length array) and nested tables, or references to objects. A VARRAY is an array with a maximum number of elements. Each element of the array belongs to the same data type. The data types to which an element may belong include user specified object types and scalar types. A nested table is a typed table (i.e. having rows that are of a certain object type) with an unbounded number of entries. Creating and representing column objects and collection objects, such as VARRAYs and nested tables, in memory is discussed in U.S. patent application Ser. No. 08/961,794, U.S. patent application Ser. No. 08/962,409, and U.S. patent application Ser. No. 08/962,535 (attorney docket no. 3018-109). An object that is referred to by a column object that is a reference may be an object residing in an object table or an object that is presented by an object view. A method for generating such references is discussed in U.S. patent application Ser. No. 08/961,740 (attorney docket no. 3018-094).

For example, consider object view OV_FAMILY_MEMBERS, the definition of which is shown in FIG. 6A. The view returns objects which each represent a person, their parents, and their children. Other definitions upon which the definition for OV_FAMILY_MEMBER depends are shown in FIGS. 6A–6F. OV_FAMILY_MEMBERS presents data from relational table PERSON (FIG. 6C) as objects of the object type OT_FAMILY (FIG. 6B).

The attributes of the objects presented by OV_FAMILY_MEMBERS are column objects of the type specified by OT_FAMILY. Referring to FIG. 6B, these are (1) PERSON_ID, an attribute representing an object belonging to the object type OT_PERSON_ID (FIG. 6D), (2) PARENTS, representing a VARRAY whose elements are objects of the object type LIST_OF_PARENTS (FIG. 6F), and (3) CHILDREN, representing a nested table of objects of the object type OT_PERSON_ID (FIG. 6E).

Referring to the definition for OV_FAMILY_MEMBERS in FIG. 6A, clause 610 specifies that the PERSON_ID attribute of OV_FAMILY_MEMBERS is constructed by invoking a constructor method associated with the object type. The parameters p.NAME and p.SSN refer to the NAME and SSN columns of the table PERSON. Thus, the data in these columns are used to initialize the column object of each object presented by OV_FAMILY_MEMBERS.

Clause 614 specifies that the column object represented by the attribute PARENTS is initialized by casting the results of the query represented by the select statement in clause 614. This select clause represents a query of the PERSON table. When executed, the query returns data for the NAME and SSN columns for each row representing the parents of a given person.

Clause 616 shows that the column object of OV_FAMILY_MEMBERS represented by the attribute children is constructed based on the casting of the data of the query represented by the select statement in clause 616. The query when executed returns data for the NAME column and SSN column for the rows representing the children of a given person.

MODIFY DATA PRESENTED BY OBJECT VIEWS

To change the data presented in any kind view, it is necessary to translate the requested modification into a modification of the underlying base table which actually contains the data of interest. However, because of the inherit problems of ambiguity that arises in translating many requests, the requested modifications can not be honored. For example, it is well known to those skilled in the art that ambiguities arise in translating requests to modify data based on views whose view definitions involve constructs such as joins, set operators, or group functions (e.g. GROUP BY or the DISTINCT operator).

Views which present data upon which a request to modify can be translated without ambiguity, are referred to as inherently modifiable views. In general, views (including object views) whose columns may be unambiguously mapped to columns in the underlying base tables are inherently modifiable.

Modifying the data presented by the view is referred to as "modifying the view", or a modifying the data in the base tables "through the view". A direct modification is a modification operation (e.g. update, insert, or delete) performed by database server 202 based on a modification request translated by database server 202. Direct modifications include direct update operations, direct insert operations, and direct delete operations.

When translating modification request based on object views, object views present their own kind of ambiguities. For example, an object view can include a column belonging to the data type VARRAY. A data structure of the VARRAY type inherently varies in size (i.e. the number of elements vary dynamically). If VARRAY elements were mapped to table columns, either the number of columns in a row have to dynamically change or a number of columns equal to the maximum size of the VARRAY must be allocated. Neither of these options are practical or efficient. Thus, object views having VARRAY columns may not be mapped to columns of base tables or views. Because a VARRAY column is not mapped to any underlying column in a base table, object views with at least one VARRAY column are not inherently modifiable.

INSTEAD-OF TRIGGERS

An "instead-of trigger" enables database server 202 to indirectly modify database 204 in response to requests to modify data through object views that are not inherently modifiable. A trigger is a procedure that is invoked upon the occurrence of a trigger event associated with the trigger. One example of a trigger event is the completion of an update operation performed upon on the particular table for which the trigger is defined. The trigger when invoked may, for example, perform modifications to related files, such as an audit file. A trigger that is invoked upon the completion of a direct update operation is referred to as an AFTER UPDATE trigger. Another type of trigger, a BEFORE UPDATE trigger, is invoked by database server 202 before performing a direct update operation.

An instead-of trigger is a trigger that is invoked in response to a request to modify the database through a view associated with the instead-of-trigger, such as a request to perform an update, insert, or delete operation upon a view. When database server 202 receives a request to modify a view, and an instead-of trigger is defined for the view, database server 202 invokes the instead-of trigger and foregoes any attempt to perform any direct modification operation itself.

A trigger is defined by database server 202 in response to receiving a request to create a trigger. For example, consider the following SQL statement issued by user 208:

Create Trigger TR_AFTER_EMPLOYEE After Update on FORMER_EMPLOYEE {ONE OR MORE BLOCKS OF CODE};

A statement issued for the purpose of defining a trigger is referred to as a trigger creation statement. In response to receiving the above trigger creation statement, database server 202 defines the trigger by adding to the data definition a trigger definition as specified by the SQL statement. In this example, the SQL statement specifies that a trigger named TR_AFTER_EMPLOYEE is to be invoked after the database server 202 performs a direct update on relational table FORMER_EMPLOYEE.

The {ONE OR MORE BLOCKS OF CODE} represent instructions associated with TR_AFTER_EMPLOYEE. The instructions are executed whenever the trigger is invoked. Database server 202 is able to execute instructions represented by block(s) of code written in PL/SQL™. The block(s) of code may include, for example, code for updating an audit table, or for calling other procedures and functions, including functions and procedures based on other languages other than PL/SQL™.

INSTEAD-OF TRIGGERS FOR MODIFYING THE DATABASE

Figure 5A:
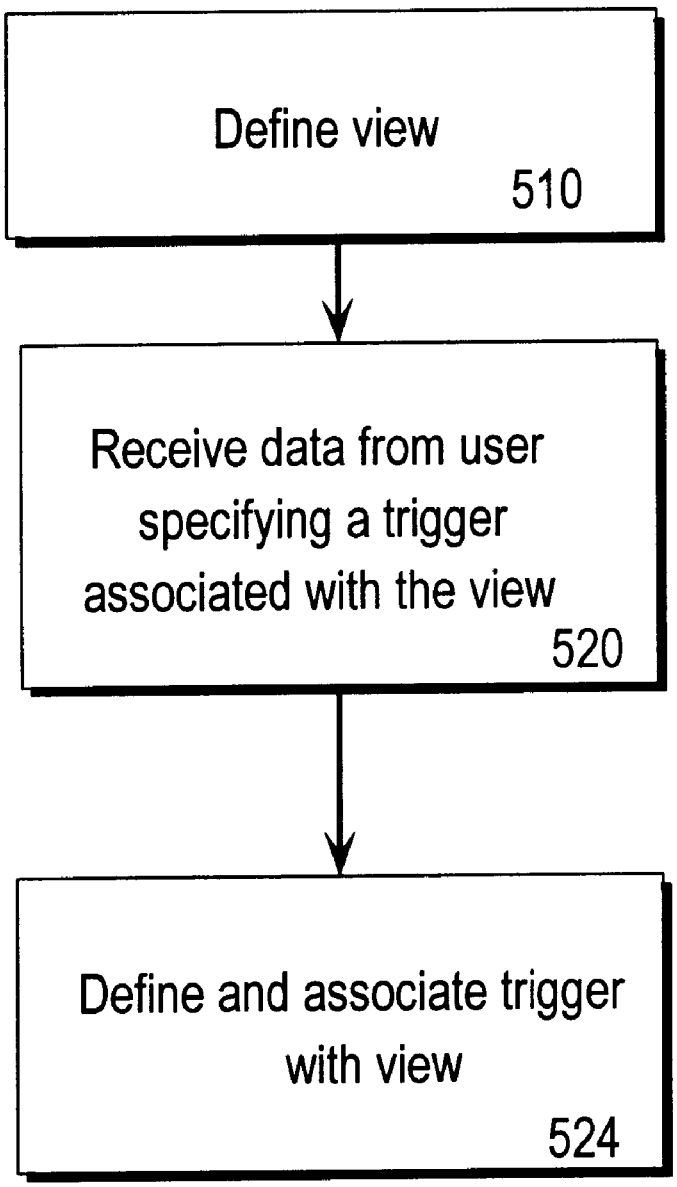
FIG. 5A is a flow chart showing steps for creating instead-of triggers for modifying a database.

FIG. 5A shows the steps of creating instead-of triggers for modifying a database. The steps of FIG. 5A are illustrated with an example based on object view OV_STATE_FEMPLOYEE (FIG. 3G). OV_STATE_FEMPLOYEE is an object view based on a join between relational tables FORMER_EMPLOYEE (FIG. 3B) and STATE (FIG. 3H). FIG. 3H shows relational table STATE. STATE has columns NAME and ABBR. ABBR represents the abbreviation of the state represented by a particular row. Assume OV_STATE_FEMPLOYEE is not inherently modifiable because OV_STATE_FEMPLOYEE involves a join.

Referring to FIG. 5A, at step 510 a view is defined by database server 202. A view is defined by database server 202 in response to database server 202 receiving a request to define a view, in a manner similar to that previously described. In this example, assume user 208 requests the creation of object view OV_STATE_FEMPLOYEE by transmitting the PL/SQL™ statement:

```
Create View OV_STATE_FEMPLOYEE As
   SELECT
      FORMER_EMPLOYEE.NAME EMP_NAME,
      SSN,
      STATE.NAME STATE_NAME
   FROM
      FORMER_EMPLOYEE,
      STATE
   WHERE
      EMP_NAME = STATE_NAME;
```

At step 520, database server 202 receives data that specifies a trigger to be associated with the object view as part of a request to create a trigger from a user. In this example, database server 202 receives as data specifying a trigger in the form a PL/SQL™ statement for creating an instead-of trigger. The PL/SQL™ statement received is as follows:

```
Create Trigger TR_OV_STATE_FEMPLOYEE Instead-of
Insert or Update On OV_STATE_FEMPLOYEE
Referencing New As n
Begin
   If Not Exists Select * From FORMER EMPLOYEES
      Where FORMER_EMPLOYEES.SSN = :n.SSN
```

```
      Then
         Insert Into FORMER_EMPLOYEES
            Values (:n.EMP_NAME, :n.SSN);
      Else
         Update FORMER_EMPLOYEES
         Set FORMER_EMPLOYEES.NAME = :n.EMP_NAME
            Where FORMER_EMPLOYEES.SSN = :n.SSN;
      End If;
   End;
```

At step 524, in response to receiving a request to create an instead-of trigger, database server 202 defines the user specified instead-of trigger and associates it with the object view. In this example, the request includes a trigger creation statement containing an Instead-of clause. The Instead-of clause specifies to database server 202 that the trigger to be defined is an instead-of trigger. The trigger creation statement also contains a trigger event clause, which is "Insert Or Update On".

A trigger event for an instead-of trigger is a request to perform a particular modification operation on the view for which the trigger is defined. The trigger event clause is followed by the name of the view for which the trigger is being defined. The trigger event clause and the name of the view together represent the trigger event for the instead-of trigger being defined. A trigger event clause may contain the modification operation keywords "Update", "Insert", "Delete", which each represent modification operations. A trigger event clause may contain more than one of the modification operation keywords.

In the current example, the clause "Insert Or Update On OV_STATE_FEMPLOYEE" is a trigger event clause followed by the view for which the trigger is being defined. Note that the trigger event clause contains two modification operation keywords. The trigger events in this example are a request to perform an insert or a delete operation on OV_STATE_FEMPLOYEE.

The portion of the received trigger creation statement following the trigger event clause are the block(s) of code representing the computer instructions comprising the instead-of trigger. The block(s) of code represent instructions that cause database server 202 to insert a new row representing a new employee in FORMER_EMPLOYEE (FIG. 3B). If the SSN column value specified by the request to perform the insert operation is equal to an SSN column value of an existing row, then that new row is updated with the EMP_NAME column value specified in the request.

In response to receiving the above trigger creation statement, database server 202 defines the trigger by adding to the data definition a trigger definition as specified by the trigger creation statement. By adding a trigger definition to the data definition of the view, the database server 202 is associating the trigger with the view. The trigger definition includes data indicating the trigger event associated with the instead-of trigger. The computer instructions associated with the trigger, or a reference to such instructions, is also included in trigger definition. A database server user 202, converts the block(s) of code contained in a trigger creation statement into a form of intermediate instructions that may be later executed by the database server 202 when the trigger is invoked.

While one format of trigger creation statement has been described, alternatives are possible. Therefore, it is understood that the present invention is not limited to any particular format of trigger creation statement. Furthermore, the present invention is not limited to any particular mechanism for defining triggers.

MODIFYING CONTENTS OF TABLES USING INSTEAD-OF TRIGGERS

Figure 5B:
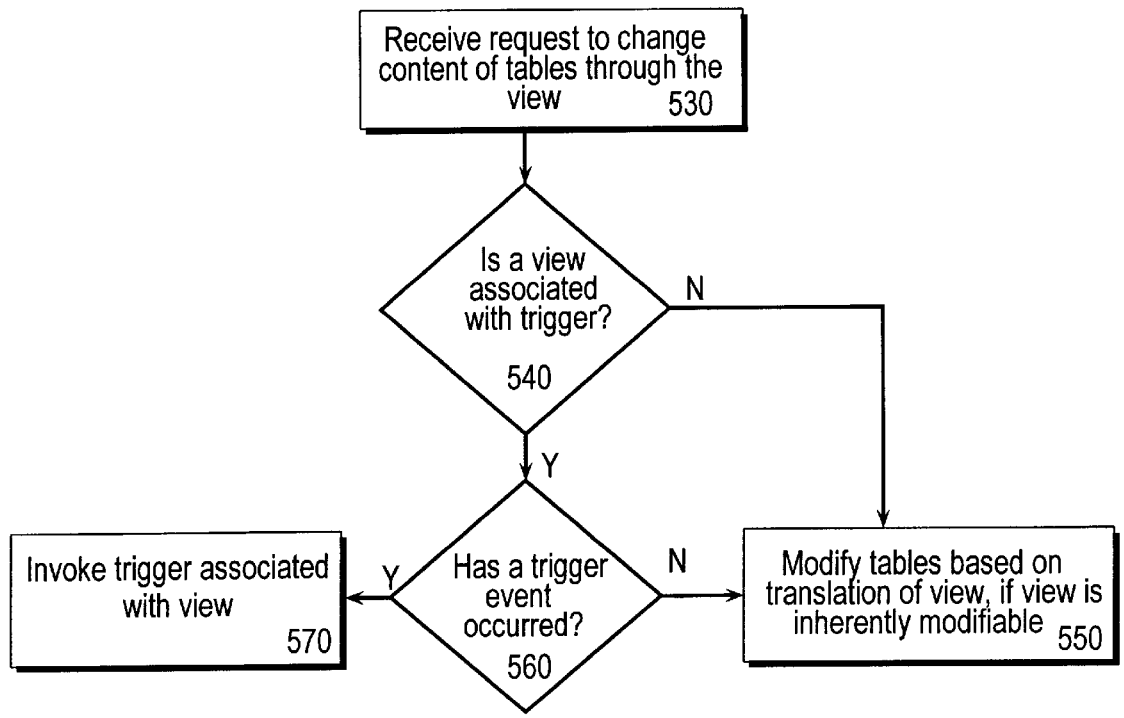
FIG. 5B is a flow chart showing steps of using instead-of triggers to modify data in a database.

FIG. 5B shows the steps of using instead-of-triggers to modify data in a database. The steps of FIG. 5B are illustrated with an example based on object view OV_STATE_FEMPLOYEE (FIG. 3G), which is not inherently modifiable At step 530, database server 202 receives a request to change the content of base table through a view by receiving a request to perform a modification operation upon a view. In this example, database server 202 receives a request to perform an insert operation upon OV_STATE_FEMPLOYEE from user 208 when user 208 transmits to database server 202 the following SQL statement:

Insert into OV_STATE_FEMPLOYEE
      Value ('Jack Doe','999-99-9991');

At step 540, a determination is made of whether the view is associated with a trigger. If the determination is that the view is associated with a trigger, then execution of the steps proceeds to step 560. Otherwise, execution of the steps proceeds to step 550. In this example, database server 202 examines the object view definition for OV_STATE_FEMPLOYEE and finds the trigger definition for the instead-of trigger TR_OV_STATE_FEMPLOYEE. Therefore, the view is associated with a trigger, the instead-of trigger, and control passes to step 560.

At step 560, a determination is made of whether a trigger event has occurred. If a trigger event has occurred, control passes to step 570. Otherwise, control passes to step 550. In this example, the database server examines the data in the trigger definition indicating which modification operations represent trigger events associated with the trigger. Because the trigger definition for TR_OV_STATE_FEMPLOYEE contains data indicating that a request for an Insert or Update on the Object View, is a trigger event, i.e. the "Insert On" clause, control passes to step 570.

At step 570, the database server executes the trigger associated with the view. In this example, database server 202 executes the instructions associated with the instead-of trigger TR_OV_STATE_FEMPLOYEE. As a result of executing the instructions, a new employee is inserted into table FORMER_EMPLOYEE. This example illustrates a significant advantage of instead-of triggers. Data in tables may be modified through views through which, without instead-of triggers, the data could not be modified.

At step 550, base tables associated with the view are modified based on translation of view, if the view is inherently modifiable.

In the foregoing specification, the invention has been describe with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for changing content of a set of one or more tables in a database system, the method comprising the steps of:

receiving a request to change the content of the set of one or more tables through a view, wherein said view is defined by database metadata that specifies an association between said view and a trigger, wherein said view is based on the one or more tables; and executing the trigger in response to said request.

2. The method of claim 1, wherein said trigger, when executed, changes the content of the set of one or more tables.

3. The method of claim 2, wherein:

the method further includes the step of determining whether said request to change the content of the set of one or more tables is a trigger event, the trigger event being an event upon whose occurrence the trigger is invoked; and the step of executing the trigger is performed if said request to change the content of the set of one or more tables is a trigger event.

4. The method of claim 3, wherein the method further includes the step of changing the content of the set of one or more tables based on a translation of the view if:

said request to change the content of the set of one or more tables is not a trigger event; and said view is inherently modifiable.

5. The method of claim 1, wherein said view is a presentation of data as a set of objects contained in the database system.

6. The method of claim 5, wherein said view is based on a set of relational tables from the database system.

7. The method of claim 1, wherein the step of receiving data from a user that specifies a trigger includes receiving data that specifies an instead-of trigger.

8. A method for changing content of a set of one or more tables in a database system, the method comprising the steps of:

said database system receiving a request to change the content of the set of one or more tables through a view defined by database metadata;

determining whether a trigger event has occurred;

if a trigger event has occurred, then executing a trigger associated with said view; and if a trigger event has not occurred, then changing the content based on a translation of the view.

9. The method of claim 8, wherein the step of executing a trigger includes executing an instead-of trigger.

10. The method of claim 8, wherein the step of changing the content based on a translation of the view is performed if said view is inherently modifiable.

11. The method of claim 8, wherein said view is a presentation of data as a set of objects contained in the database system.

12. The method of claim 11, wherein said view is based on a set of relational tables from the database system.

13. A method for presenting data from a set of one or more tables in a database, the method comprising the steps of:

reading data from one or more rows of the set of one or more tables based on an object view that is defined by database metadata and that is based on the set of one or more tables, the object view defining a presentation of data as a set of objects that reside in said database, the set of one or more tables including at least one relational table; and presenting said data from one or more rows as a set of objects that reside in said database.

14. The method of claim 13, wherein said object view is based on a set of one or more tables that includes at least one object table.

15. The method of claim 13, wherein:

the method further includes the step of creating a new object id based on values from said one or more rows; and wherein the step of presenting data includes presenting an object from said set of objects as having said object id.

16. The method of claim 15, wherein the step of creating a new object id based on values includes generating an object id based on values from one or more rows of said at least one relational table.

17. The method of claim 15, wherein:

the method further includes the steps of:

receiving a request to define said object view, said request specifying one or more columns of the set of one or more tables containing values used to generate said object id;

in response to receiving the request to define said object view, storing specification data that specifies the one or more columns; and the step of creating a new object id based on values from said one or more rows includes determining how to generate the object id by inspecting said specification data.

18. The method of claim 17, wherein the step of receiving a request to define an object view includes receiving a request that specifies the one or more columns as including at least one column from said at least one relational table.

19. A database system, comprising:

a set of one or more tables;

said database system configured to define a view based on the set of one or more tables, the view defining a presentation of data from the set of one or more tables;

said database system configured to store database metadata defining said view;

said database system configured to receive data from a user that specifies a trigger to associate with said view;

said database system configured to associate the trigger with the view;

said database system configured to receive a request to change content of the set of one or more tables through the view; and said database system configured to execute the trigger in response to said request.

20. A database system, comprising:

a set of one or more tables;

said database system configured to store database metadata defining a view;

said database system configured to receive a request to change content of the set of one or more tables through the view;

said database system configured to determine whether a trigger event has occurred;

said database system configured to execute a trigger associated with said view if a trigger event has occurred; and said database system configured to change the content of the set of one or more tables based on a translation of the view if a trigger event has not occurred.

21. A database system, comprising:

a set of one or more tables that includes at least one relational table;

said database system configured to receive data that defines an object view based on the set of one or more tables, the object view defining a presentation of data as a set of objects that reside in a database;

said database system configured to store database metadata that defines said object view;

said database system receiving a request to change the content of the set of one or more tables through a view defined by database metadata;

determining whether a trigger event has occurred;

if a trigger event has occurred, then executing a trigger associated with said view; and if a trigger event has not occurred, then changing the content based on a translation of the view.

22. A computer-readable medium carrying one or more sequences of one or more instructions for changing content of a set of one or more tables in a database system, wherein the execution of the one or more sequences of the one or more instructions causes the one or more processors to perform the steps of:

receiving a request to change the content of the set of one or more tables through a view, wherein said view is defined by database metadata that specifies an association between said view and a trigger, wherein said view is based on the one or more tables; and executing the trigger in response to said request.

23. The computer readable medium of claim 22, wherein said trigger, when executed, changes the content of the set of one or more tables.

24. The computer-readable medium of claim 23, wherein:

the computer-readable medium further includes sequences of instructions for performing the step of determining whether said request to change the content of the set of one or more tables is a trigger event, the trigger event being an event upon whose occurrence the trigger is invoked; and the step of executing the trigger is performed if said request to change the content of the set of one or more tables is a trigger event.

25. The computer-readable medium of claim 24, wherein the computer-readable medium further includes sequences of instructions for performing the step of changing the content of the set of one or more tables based on a translation of the view if:

said request to change the content of the set of one or more tables is not a trigger event; and said view is inherently modifiable.

26. The computer readable medium of claim 22, wherein said view is a presentation of data as a set of objects contained in the database system.

27. The computer-readable medium of claim 26, wherein said view is based on a set of relational tables from the database system.

28. The computer-readable medium of claim 22, wherein the step of receiving data from a user that specifies a trigger includes receiving data that specifies an instead-of trigger.

29. A computer-readable medium carrying one or more sequences of one or more instructions for changing content of a set of one or more tables in a database system, wherein the execution of the one or more sequences of the one or more instructions causes the one or more processors to perform the steps of:

said database system receiving a request to change the content of the set of one or more tables through a view defined by database metadata;

determining whether a trigger event has occurred;

if a trigger event has occurred, then executing a trigger associated with said view; and if a trigger event has not occurred, then changing the content based on a translation of the view.

30. The computer readable medium of claim 29, wherein the step of executing a trigger includes executing an instead-of trigger.

31. The computer-readable medium of claim 29, wherein the step of changing the content based on a translation of the view is performed if said view is inherently modifiable.

32. The computer-readable medium of claim 29, wherein said view is a presentation of data as a set of objects contained in the database system.

33. The computer-readable medium of claim 32, wherein said view is based on a set of relational tables from the database system.

34. A computer-readable medium carrying one or more sequences of one or more instructions for presenting data from a set of one or more tables in a database, wherein the execution of the one or more sequences of the one or more instructions causes the one or more processors to perform the steps of:

reading data from one or more rows of the set of one or more tables based on an object view that is defined by database metadata and that is based on the set of one or more tables, the object view defining a presentation of data as a set of objects that reside in said database, the set of one or more tables including at least one relational table; and presenting said data from one or more rows as a set of objects that reside in said database.

35. The computer readable medium of claim 34, wherein said object view is based on a set of one or more tables that includes at least one object table.

36. The computer-readable medium of claim 34, wherein:

the computer-readable medium further includes sequences of instructions for performing the step of creating a new object id based on values from said one or more rows; and wherein the step of presenting data includes presenting an object from said set of objects as having said object id.

37. The computer-readable medium of claim 36, wherein the step of creating a new object id based on values includes generating an object id based on values from one or more rows of said at least one relational table.

38. The computer-readable medium of claim 36, wherein:

the computer-readable medium further includes sequences of instructions for performing the steps of:

receiving a request to define said object view, said request specifying one or more columns of the set of one or more tables containing values used to generate said object id;

in response to receiving the request to define said object view, storing specification data that specifies the one or more columns; and the step of creating a new object id based on values from said one or more rows includes determining how to generate the object id by inspecting said specification data.

39. The computer-readable medium of claim 38, wherein the step of receiving a request to define an object view includes receiving a request that specifies the one or more columns as including at least one column from said at least one relational table.

* * * * *